(12) United States Patent
Dietrich

(10) Patent No.: US 11,785,892 B2
(45) Date of Patent: Oct. 17, 2023

(54) PREVENTING DAMAGE FROM DISLODGED CROP SAVING ACCESSORIES

(71) Applicant: 101288550 Saskatchewan Ltd., Assiniboia (CA)

(72) Inventor: Dave Dietrich, Assiniboia (CA)

(73) Assignee: 101288550 Saskatchewan Ltd.

(*) Notice: Subject to any disclaimer, the term of this patent is extended or adjusted under 35 U.S.C. 154(b) by 598 days.

(21) Appl. No.: 16/769,755

(22) PCT Filed: Jan. 7, 2019

(86) PCT No.: PCT/CA2019/050018
§ 371 (c)(1),
(2) Date: Jun. 4, 2020

(87) PCT Pub. No.: WO2019/136553
PCT Pub. Date: Jul. 18, 2019

(65) Prior Publication Data
US 2020/0383270 A1  Dec. 10, 2020

(30) Foreign Application Priority Data

Jan. 9, 2018 (CA) ................................ CA 2991348

(51) Int. Cl.
*A01D 65/02* (2006.01)
*A01D 75/18* (2006.01)

(52) U.S. Cl.
CPC .............. *A01D 65/02* (2013.01); *A01D 75/18* (2013.01)

(58) Field of Classification Search
CPC ...... A01D 75/18; A01D 75/185; A01D 65/02; A01D 65/00
See application file for complete search history.

(56) References Cited

U.S. PATENT DOCUMENTS

| | | | | |
|---|---|---|---|---|
| 723,880 A | * | 3/1903 | Koch | A01D 65/02 56/312 |
| 1,204,441 A | * | 11/1916 | Holland-Letz | A01D 65/02 56/313 |

(Continued)

FOREIGN PATENT DOCUMENTS

| | | |
|---|---|---|
| CA | 2618562 A1 | 2/2007 |
| WO | 2013020208 A1 | 2/2013 |

*Primary Examiner* — Thomas B Will
*Assistant Examiner* — Joan D Misa
(74) *Attorney, Agent, or Firm* — Craig J. Lervick; Larkin Hoffman Daly & Lindgren, Ltd.

(57) ABSTRACT

An attachment system for attaching a crop saving accessory to a cutting header where the cutting header comprises a knife mounted along a lower front edge thereof and a discharge opening in a middle rear portion thereof. The header cuts plants and moves the plants laterally to the discharge opening where the plants move rearward through the discharge opening. The system comprises an accessory engagement mechanism on a rear portion of the crop saving accessory configured to engage a header engagement mechanism mounted on the cutting header. A first end of a tether is attached to the crop saving accessory and a second end of the tether is adapted for attachment to a tether location on the cutting header. The tether is configured such that when the accessory engagement mechanism is disengaged from the header engagement mechanism, the tether prevents the crop saving accessory from moving through the discharge opening.

15 Claims, 2 Drawing Sheets

(56) References Cited

U.S. PATENT DOCUMENTS

| | | | | |
|---|---|---|---|---|
| 1,847,072 | A | * | 3/1932 | Eakin ..................... A01D 65/02 56/312 |
| 2,577,324 | A | * | 12/1951 | Goesch ................. A01D 65/02 56/312 |
| 3,313,095 | A | * | 4/1967 | Gaterman .............. A01D 34/14 56/312 |
| 4,255,920 | A | | 3/1981 | Janzen |
| 6,442,919 | B1 | | 9/2002 | Schumacher et al. |
| 6,564,536 | B1 | | 5/2003 | Hoffer |
| 6,655,120 | B2 | | 12/2003 | Schumacher et al. |
| 7,650,738 | B2 | | 1/2010 | Dietrich |
| 8,196,381 | B2 | | 6/2012 | Herman et al. |
| 8,991,145 | B2 | | 3/2015 | Dietrich |
| 10,015,929 | B1 | * | 7/2018 | Atchison ................ A01D 34/40 |

\* cited by examiner

PREVENTING DAMAGE FROM DISLODGED CROP SAVING ACCESSORIES

This disclosure relates to the field of combine harvesting equipment and in particular a system for protecting combines from damage caused by crop saving accessories, such as crop lifters and seed pans, being dislodged from their mounting on a cutting header and being swept into internal combine mechanisms.

BACKGROUND

The knife on a typical agricultural cutting header comprises a knife bar extending along the front lower edge of the header, with a plurality of triangular knife sections attached to the bar such that the apex of the triangle extends forward from the bar. The exposed side edges of the knife sections are sharpened. Guards are attached to the front lower edge of the header and serve to protect the knife sections from breakage when contacting stones and like obstructions. The guards comprise pointed guard fingers extending forward, and the knife moves back and forth along the edge of the header in a slot cut laterally through the guard fingers. In addition to protecting the knife, the guard fingers also enable the knife sections to cut the crop. As the knife section moves back and forth it pushes crop against the sides of those portions of the guard finger that are above and below the slot, shearing the crop stalks.

Different types of crop saving accessories have been developed over time for attachment to the front edge of such cutting headers to deal with various adverse conditions that arise. For example crop plants sometimes are lying so close to the ground that it is difficult to cut them with a conventional harvest header. Some crops are inherently short, while others may be taller, but are prone to fall down when they reach maturity. Heavy rain, wind, or hail can also cause crop stalks to be lying close to the ground at harvest time. A conventional knife is a few inches above the ground when the header is in its lowest position, such that very short or downed crop material will pass under the knife and be lost. To address this problem crop saving accessories known as crop lifters have been developed over the last century and more.

Typically these crop lifters are attached to the header and/or the forward extending point of the guard finger, and provide an arm of various designs that rides along the ground ahead of the knife. A lifting finger extends at a shallow angle from the front of the arm back and over the knife. As the header moves down the field, the arm rides along the ground and under the downed crop stalks, which then are lifted and pass over the lifting finger to the knife, where they are cut and continue moving onto the header from where they can be passed into the internal threshing mechanisms of the combine, or laid in a swath for later harvesting.

Typical crop lifters are disclosed for example in U.S. Pat. Nos. 7,650,738 and 8,991,145 to the present inventor Dietrich, and in U.S. Pat. Nos. 6,655,120 and 6,442,919 to Schumacher et al.

Another problem addressed by crop saving accessories is shatter loss. Seed pods or heads can shatter when contacted by the harvesting equipment before they are on the header, and the shattered pods or heads spill their seeds to fall on the ground. Thus most of the shattering loss occurs in the area generally just above the knife when the stalk is contacted by the rapidly moving knife. Seeds fall from the shattered pods down through the knife to the ground. While this problem of shattering seed pods and heads is more severe in some crops than others, there is generally at least some shattering loss in any crop. It is therefore known to attach seed pans to the cutting header, as disclosed in U.S. Pat. No. 8,196,381 to Herman et al., U.S. Pat. No. 4,255,920 to Janzen, and U.S. Pat. No. 6,564,536 to Hoffer.

Damage can occur when a crop saving accessory is broken or dislodged from the header. A typical cutting header on a combine includes a reel to gather crop plants ahead of the header and push same towards the knife as the header moves forward. Dislodgment may occur when a crop saving accessory is bent upward by an obstruction in the field, such that the reel can contact the crop saving accessory with sufficient force to break the crop saving accessory or dislodge it from the header and sweep the crop saving accessory, or broken part thereof, onto the header surface where same can be carried into the internal mechanisms of the combine and cause serious damage. Such cutting headers are also used on swathing machines which cut and lay the crop plants in a swath for later harvesting. A dislodged or broken crop saving accessory lying in a swath may be picked up with the swath and cause damage to the combine mechanisms as well.

SUMMARY OF THE INVENTION

The present disclosure provides a crop saving accessory attachment system that overcomes problems in the prior art.

In a first embodiment the present disclosure provides an attachment system for attaching a crop saving accessory to a cutting header where the cutting header comprises a knife mounted along a lower front edge thereof and a discharge opening in a middle rear portion thereof. The cutting header is operative to cut crop plants and move the cut crop plants laterally along a header surface to the discharge opening such that the cut crop plants move rearward through the discharge opening. The system comprises an accessory engagement mechanism on a rear portion of the crop saving accessory, the accessory engagement mechanism configured to engage a header engagement mechanism mounted on the cutting header. A tether is attached to the crop saving accessory at a first end thereof and is adapted at a second end thereof for attachment to a tether location on the cutting header. The tether is configured such that when the accessory engagement mechanism is disengaged from the header engagement mechanism, the tether prevents the crop saving accessory from moving rearward through the discharge opening.

In a second embodiment the present disclosure provides a crop saving accessory attachment system comprising a cutting header comprising a knife mounted along a lower front edge thereof and a discharge opening in a middle rear portion thereof. The cutting header is operative to cut crop plants and move the cut crop plants laterally along a header surface to the discharge opening such that the cut crop plants move rearward through the discharge opening. A crop saving accessory comprises an accessory engagement mechanism on a rear portion thereof, the accessory engagement mechanism releasably engaged with a header engagement mechanism mounted on the cutting header to hold the crop saving accessory to the cutting header. A tether is attached to the crop saving accessory at a first end thereof and is attached at a second end thereof to a tether location on the cutting header. The tether is configured such that when the accessory engagement mechanism is disengaged from the header engagement mechanism, the tether prevents the crop saving accessory from moving rearward through the discharge opening.

The tether of the present disclosure will prevent a dislodged crop saving accessory from moving out through the discharge opening where same can cause significant damage to a combines inner threshing mechanisms. Further, experience may show where a contemplated crop saving accessory is weak and prone to break, and the first end of the tether may be fastened at a point on the crop saving accessory beyond the break point such that the broken part may remain attached to the tether.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
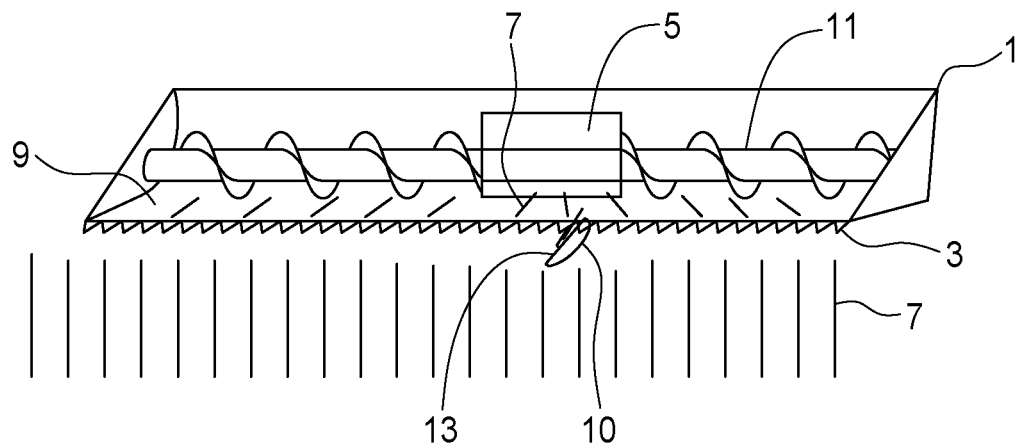
FIG. 1 is a schematic perspective view of a conventional cutting header with an embodiment of the attachment system of the present disclosure for attaching a crop saving accessory to the cutting header.

FIG. 1 schematically illustrates a conventional cutting header 1 of the prior art comprising a knife 3 mounted along a lower front edge thereof and a discharge opening 5 in a middle rear portion thereof. As is known in the art the cutting header 1 is operative to cut crop plants and move the cut crop plants 7 laterally along a header surface 9 to the discharge opening 5 such that the cut crop plants 7 move rearward through the discharge opening 5. The illustrated cutting header 1 comprises a horizontal header auger 11 extending along a width thereof above a rear portion of the header surface 9 to carry the cut plants to the discharge opening 5. This type of header 1 is typically mounted on a combine where the discharge opening 5 is connected to a feeder house which carries the crop plants 7 into the internal threshing mechanisms of the combine.

Instead of the auger 11 other types of headers use a moving canvas to carry the cut plants to the discharge opening. These headers may also be mounted on combines, and are commonly mounted on swathers where the cut plants move through the discharge opening and are laid in a swath for later pickup by a harvesting implement.

FIG. 1 also schematically illustrates an embodiment of an attachment system 10 of the present disclosure for attaching a crop saving accessory 13, here illustrated as a crop lifter, to the cutting header 5.

Figure 2:
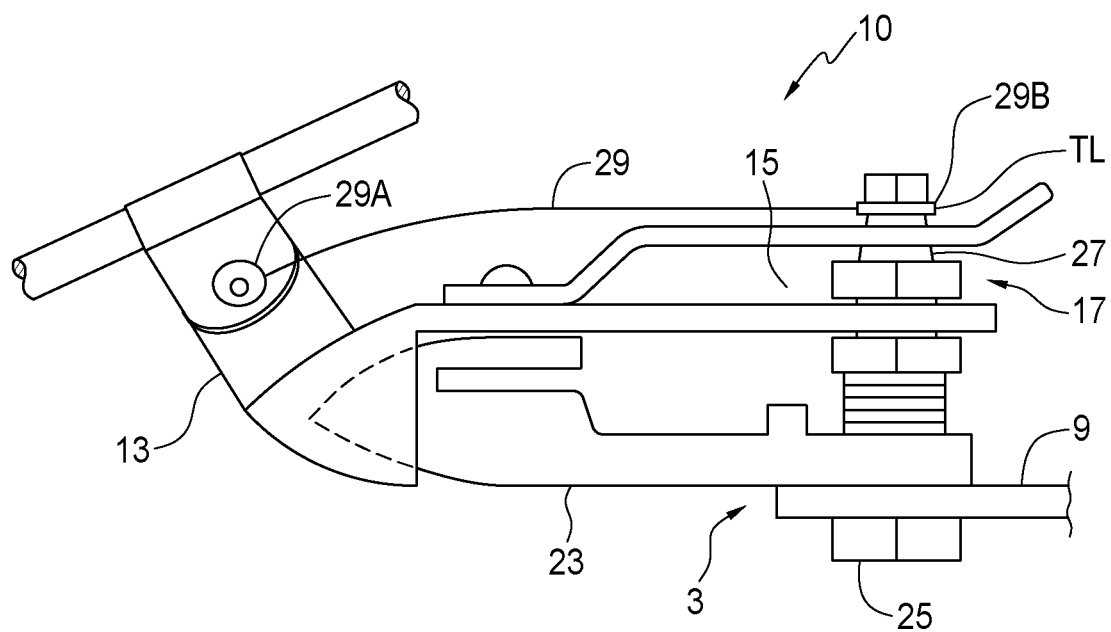
FIG. 2 is a schematic side view of the embodiment of the attachment system of FIG. 1.
Figure 4:
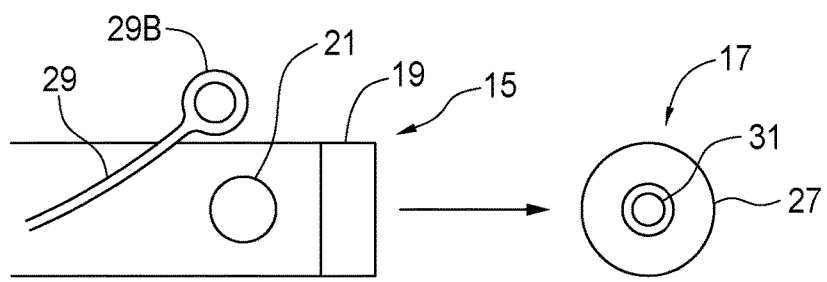
FIG. 4 is a schematic top view showing the accessory engagement mechanism of the embodiment of FIG. 2 moving in the direction of the arrow to engage a header engagement mechanism.
Figure 5:
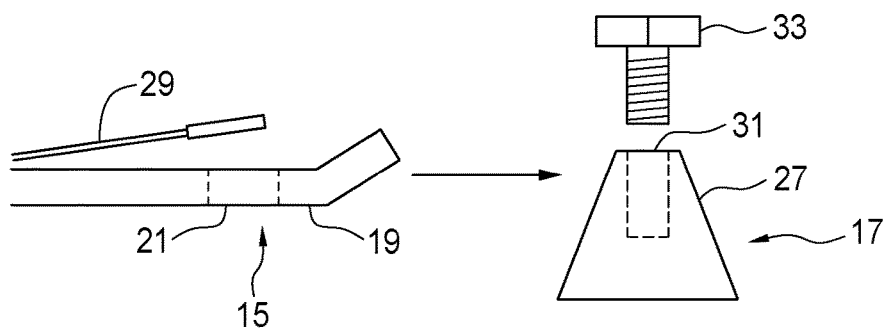
FIG. 5 is a schematic side view showing the accessory engagement mechanism of the embodiment of FIG. 2 moving in the direction of the arrow to engage a header engagement mechanism.

As schematically illustrated in FIG. 2, the system 10 comprises an accessory engagement mechanism 15 on a rear portion of the crop saving accessory 13. The accessory engagement mechanism 15 is configured to engage a header engagement mechanism 17 mounted on the cutting header 1. The illustrated accessory engagement mechanism 15 and the header engagement mechanism 17 allow quick attachment of the crop saving accessory 13 to the header 1 and are schematically illustrated in FIGS. 4 and 5. The accessory engagement mechanism 15 comprises a spring plate 19 and an engagement hole 21 defined therein.

The cutting header 1 comprises knife guards 23 attached to the lower front edge thereof with guard bolts 25, and the header engagement mechanism 17 comprises a conical header member 27 attached to a guard bolt 25 and extending upward from the guard bolt 25. The engagement hole 21 is configured such that the header member 27 extends upward through the engagement hole 21 when the accessory engagement mechanism 15 engages the header engagement mechanism 17.

As the spring plate 19 is moved rearward toward the conical member 27 the spring plate 19 bends upward and over the top end of the conical member 27 until the hole 21 is aligned with the top end of the conical member 27 which is smaller than the hole 21. The spring plate 19 then moves downward along the sloping conical sides of the conical member 27 to a point where the conical member 27 fills the hole 21, and the top end of the conical member 27 is above the spring plate 19 as seen in FIG. 2.

A tether 29 is attached to the crop saving accessory 13 at a first end 29A thereof and is adapted at a second end 29B thereof for attachment to a tether location TL on the cutting header 1. In the attachment system 10 of FIG. 2 the second end 29B of the tether 29 is adapted to be attached to a guard bolt 25 which is in turn attached to the cutting header 1. The tether 29 is configured such that when the accessory engagement mechanism 15 is disengaged from the header engagement mechanism 17 the tether 29 prevents the crop saving accessory 13 from moving rearward through the discharge opening 5 where same can cause significant damage to the internal mechanisms of a combine. The tether 29 then is configured such that a distance from the tether location TL to the discharge opening 5 is greater than a length of the tether 29 from the first end 29A thereof to the second end 29B thereof.

For clarity of illustration FIG. 1 shows only one crop saving accessory 13 mounted on the cutting header however crop saving accessories 13 are typically evenly spaced along the entire length of the knife 3 and the width of the header 1. It can be seen that the distance from each crop saving accessory 13 to the discharge opening 5 varies considerably and in practice each tether 29 is typically quite short.

In the illustrated attachment system 10, when the accessory engagement mechanism 15 is engaged in the header engagement mechanism 17, the distance from the first end 29A of the tether 29 to the tether location TL is substantially equal to a length of the tether 29. Thus the tether 29 is tight which in addition to keeping a dislodged crop saving accessory 13 from passing through the discharge opening 5, also helps to prevent the crop saving accessory from becoming dislodged in the first place.

For example the illustrated cutting header 1 comprises the header auger 11 extending along a width thereof above a rear portion of the header surface. The tether 29 can be configured such that when the crop saving accessory 13 is laid on the header surface 9 in a dislodged position, the tether 29 prevents the crop saving accessory 13 from moving rearward into contact with the header auger 11.

In the attachment system 10 of FIG. 2, the tether location TL is at a top end of the conical header member 27 which defines a threaded tether hole 31. The second end of the tether 29B is configured to be attached to the tether location TL by a tether bolt 33 threaded into the tether hole 31, and the tether 29 is attached at the first end 29A thereof to a middle portion of the crop saving accessory 13.

The tether bolt 33 requires a wrench to be threaded and tightened into the tether hole 31, while the original quick detach system requires no tools. Only a small amount of time however is required to thread the tether bold through the second end 29B of the tether 29, and the benefits of the tether will in many cases be worth the small amount of added time. It is contemplated that the second end 29B of the tether 29 could be attached at a tether location TL at any fixed location on the header 1 that is located to prevent the dislodged crop saving accessory 13 from passing through the discharge opening 5.

Figure 3:
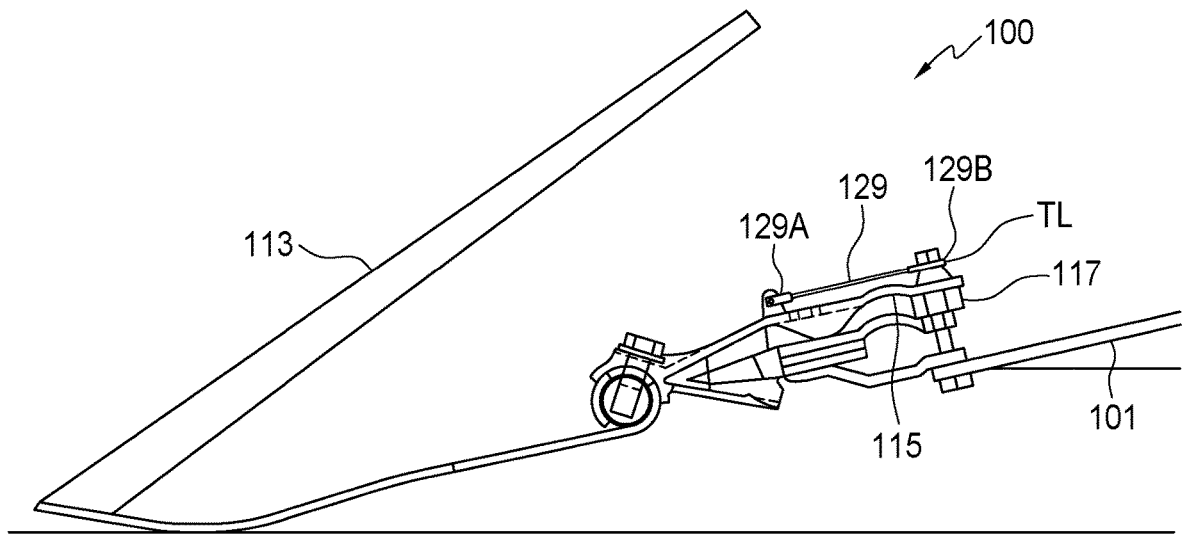
FIG. 3 is a schematic side view of an alternate embodiment of the attachment system of the present disclosure.

FIG. 3 schematic illustrates an alternate embodiment of a crop saving accessory attachment system 100 where the crop saving accessory 113 has an adjustable angle. The accessory engagement mechanism 115 configured to engage the header engagement mechanism 117 mounted on the cutting header 101 are similar in operation to the accessory engagement mechanism 15 and header engagement mechanism 17 of FIGS. 2, 4 and 5. Again the tether 129 is configured to be substantially tight when the ends 129A, 129B are attached.

The illustrated crop saving accessory attachment systems are shown with the common quick detach accessory engagement mechanisms 15, 115 and header engagement mechanisms 17, 117 however it can be seen that the tether system of the present disclosure could be readily adapted for use with any type of crop saving accessory attachment system.

The tether 29 will prevent a dislodged crop saving accessory 13 from moving out through the discharge opening where same can cause significant damage to a combines inner threshing mechanisms. Further, experience may show where a contemplated crop saving accessory is weak and prone to break, and the first end 29A may be fastened at a point on the crop saving accessory beyond the break point such that the broken part may remain attached to the tether.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An attachment system for attaching a crop saving accessory to a cutting header, the cutting header comprising a knife mounted along a lower front edge thereof and a discharge opening in a middle rear portion thereof, the cutting header operative to cut crop plants and move the cut crop plants laterally along a header surface to the discharge opening such that the cut crop plants move rearward through the discharge opening, the system comprising:
   an accessory engagement mechanism on a rear portion of the crop saving accessory, the accessory engagement mechanism configured to engage a header engagement mechanism mounted on the cutting header; and
   a tether attached to the crop saving accessory at a first end thereof and adapted at a second end thereof for attachment to a tether location on the cutting header,
   wherein the tether is configured such that when the accessory engagement mechanism is disengaged from the header engagement mechanism, the tether prevents the crop saving accessory from moving rearward through the discharge opening,
   and wherein the cutting header comprises knife guards attached to the lower front edge thereof with guard bolts,
   and wherein the second end of the tether attaches to one of the guard bolts.

2. The system of claim 1 wherein the tether is configured such that a distance from the tether location to the discharge opening is greater than a length of the tether from the first end thereof to the second end thereof.

3. The system of claim 1 wherein the header engagement mechanism comprises a header member adapted to be attached to one of the guard bolts such that the header member extends upward from one of the guard bolts, and wherein the accessory attachment mechanism comprises a spring plate and an engagement hole defined in the plate and configured such that the header member extends upward through the engagement hole when the accessory engagement mechanism engages the header engagement mechanism.

4. The system of claim 3 wherein the tether location is at a top end of the header member.

5. The system of claim 4 wherein the top end of the header member defines a threaded tether hole and wherein the second end of the tether is configured to be attached to the tether location by a tether bolt threaded into the tether hole.

6. The system of claim 5 wherein the tether is attached at the first end thereof to a middle portion of the crop saving accessory.

7. The system of claim 1 wherein when the accessory engagement mechanism is engaged in the header engagement mechanism, a distance from the first end of the tether to the tether location is substantially equal to a length of the tether.

8. The system of claim 1 wherein the cutting header comprises a substantially horizontal header auger extending along a width thereof above a rear portion of the header surface, and wherein the tether is configured such that when the accessory engagement mechanism is disengaged from the header engagement mechanism, the tether prevents the crop saving accessory from moving rearward into contact with the header auger.

9. A crop saving accessory attachment system comprising:
   a cutting header comprising a knife mounted along a lower front edge thereof and a discharge opening in a middle rear portion thereof, the cutting header operative to cut crop plants and move the cut crop plants laterally along a header surface to the discharge opening such that the cut crop plants move rearward through the discharge opening;
   a crop saving accessory comprising an accessory engagement mechanism on a rear portion thereof, the accessory engagement mechanism releasably engaged with a header engagement mechanism mounted on the cutting header to hold the crop saving accessory to the cutting header; and
   a tether attached to the crop saving accessory at a first end thereof and attached at a second end thereof to a tether location on the cutting header,
   wherein the tether is configured such that when the accessory engagement mechanism is disengaged from the header engagement mechanism, the tether prevents the crop saving accessory from moving rearward through the discharge opening, and wherein the cutting header comprises knife guards attached to the lower front edge thereof with guard bolts, and wherein the second end of the tether is attached to one of the guard bolts.

10. The system of claim 9 wherein a distance from the tether location to the discharge opening is greater than a length of the tether from the first end thereof to the second end thereof.

11. The system of claim 9 wherein the header engagement mechanism comprises a header member attached to one of the guard bolts such that the header member extends upward from one of the guard bolts, and wherein the accessory attachment mechanism comprises a spring plate and an engagement hole defined in the plate and wherein the header member extends upward through the engagement hole when the accessory engagement mechanism is engaged with the header engagement mechanism.

12. The system of claim 11 wherein the tether location is at a top end of the header member.

13. The system of claim 12 wherein the top end of the header member defines a threaded tether hole and wherein the second end of the tether is attached to the tether location by a tether bolt threaded into the tether hole.

14. The system of claim 13 wherein the tether is attached at the first end thereof to a middle portion of the crop saving accessory.

15. The system of claim 9 wherein the cutting header comprises a substantially horizontal header auger extending along a width thereof above a rear portion of the header surface, and wherein the tether is configured such that when the accessory engagement mechanism is disengaged from the header engagement mechanism, the tether prevents the crop saving accessory from moving rearward into contact with the header auger.

* * * * *

UNITED STATES PATENT AND TRADEMARK OFFICE
CERTIFICATE OF CORRECTION

PATENT NO. : 11,785,892 B2
APPLICATION NO. : 16/769755
DATED : October 17, 2023
INVENTOR(S) : Dave Dietrich It is certified that error appears in the above-identified patent and that said Letters Patent is hereby corrected as shown below:

On the Title Page

At Column 1, (73) Assignee, delete "Ltd." and insert -- Ltd., Assiniboia (CA) --.

Signed and Sealed this
Ninth Day of January, 2024

Katherine Kelly Vidal
*Director of the United States Patent and Trademark Office*